JOHN A. MORTON.
Improvement in Fertilizer Distributers.
No. 115,505.                  Patented May 30, 1871.
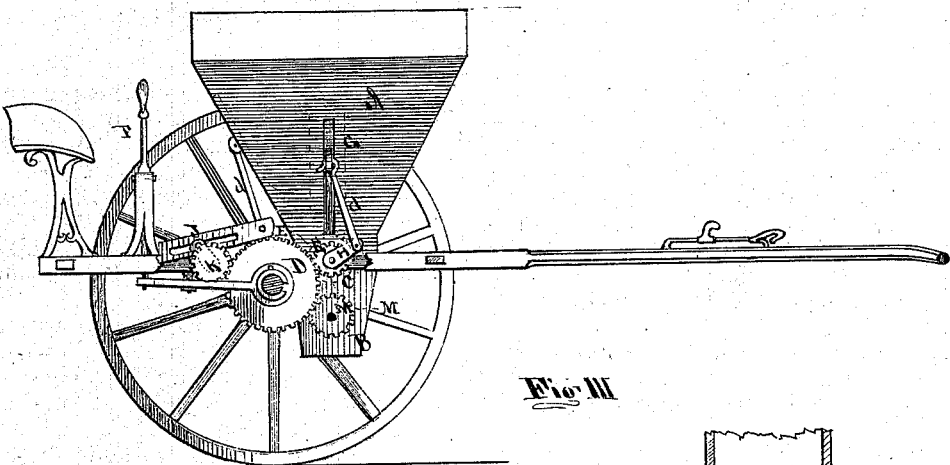
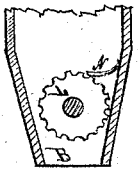
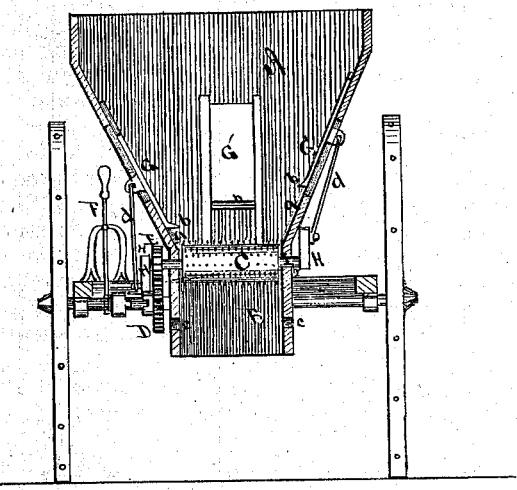

UNITED STATES PATENT OFFICE.

JOHN A. MORTON, OF NEW ORLEANS, LOUISIANA.

IMPROVEMENT IN FERTILIZER-DISTRIBUTERS.

Specification forming part of Letters Patent No. 115,505, dated May 30, 1871.

*To all whom it may concern:*

Be it known that I, JOHN A. MORTON, of the city of New Orleans, parish of Orleans, State of Louisiana, have made certain new Improvements in Seed and Fertilizer Distributers; and I do hereby declare that the following is a full and clear description thereof, reference being had to the accompanying drawing and the letters of reference marked thereon.

In the drawing, Figure I is a side view of my device. Fig. II is a front sectional view. Fig. III is a detailed sectional view of a part thereof.

The object of my invention is to obtain a simple and effective distributer for seed and fertilizers more especially adapted to sowing cotton-seed with sugar-cane, and to sowing fertilizers, such as guano, bone-dust, plaster, in the furrows where sugar-cane is to be planted, only a very slight alteration being required to adapt the machine to either the seed or fertilizing substance.

In construction I form my machine with a hopper, A, into which the substance to be sown is placed. This hopper is mounted upon wheels, the axle of which revolves and operates the machinery within the hopper wherewith the seed or fertilizer is sown evenly. The machine is intended to straddle the furrow, a spout, B, projecting downward in the middle from the tapering hopper to deliver the substance within. At the junction of the spout and hopper, inside, is a toothed cylinder, C, which is revolved by the axle through the intermediate agency of the gear-wheel D on the axle and the pinion E on the end of the cylinder-shaft where it projects outside of the hopper. A shipper, F, constructed in the ordinary manner, is used to throw the gear-wheel D fast or loose upon the axle. Inside of the hopper, working in gibbed slides *a a*, are followers G G G', which are provided with projections *b b b* at their lower ends, and are continually and alternately engaged in pushing the seed or other substance down to the mouth of the spout B, the ones G G at the sides of the hopper being worked by means of cranks H H set on the projecting ends of the shaft I of the cylinder C, and the one G' at the rear of the hopper being worked by a separate crank, J, and pinion K engaging with the gear-wheel D.

In Fig. III of the drawing is shown a sectional side view of the spout B, in which is arranged a fluted or corrugated cylinder, L, revalved by means of a pinion, M, meshing with the gear-wheel D, and shown in Fig. I, Fig. II showing the device without the cylinder L, but discovering the bearings *c c* of its shaft. A scraper, N, is provided for the cylinder L to free it from the guano that adheres to it.

In operating my machine it is only necessary to remove the cylinder L when cotton-seed is to be sown, which is easily effected by having a loose shaft kept in place by a linchpin, and to replace it when any finely-pulverized fertilizer is distributed.

In distributing some finely-powdered dry substances it is not necessary that the followers should be in operation, and in this case the crank-rods *d d d* may be unhooked.

Having described my invention, what I claim as new, and desire to secure by Letters Patent, is—

1. The combination of the hopper A provided with followers G G G', toothed cylinder C, and spout B, with the revolving axle and intermediate gear D and F, the parts being constructed and arranged in the manner and for the purpose herein set forth.

2. In combination with the hopper A, constructed as described, the cylinder L, arranged in the manner and for the purpose set forth.

JOHN A. MORTON.

Witnesses:
EDWARD H. HYDE,
SAMUEL B. CLEVELAND.